United States Patent
Chuang et al.

(10) Patent No.: US 12,069,289 B2
(45) Date of Patent: *Aug. 20, 2024

(54) METHOD AND APPARATUS OF MOTION-VECTOR ROUNDING UNIFICATION FOR VIDEO CODING SYSTEM

(71) Applicant: HFI Innovation Inc., Zhubei (TW)

(72) Inventors: Tzu-Der Chuang, Hsinchu (TW); Ching-Yeh Chen, Hsinchu (TW); Zhi-Yi Lin, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/692,638

(22) Filed: Mar. 11, 2022

(65) Prior Publication Data

US 2022/0201325 A1    Jun. 23, 2022

Related U.S. Application Data

(63) Continuation of application No. 16/559,966, filed on Sep. 4, 2019, now Pat. No. 11,310,520.

(Continued)

(51) Int. Cl.
*H04N 19/513* (2014.01)
*H04N 19/139* (2014.01)
*H04N 19/176* (2014.01)

(52) U.S. Cl.
CPC ......... *H04N 19/513* (2014.11); *H04N 19/139* (2014.11); *H04N 19/176* (2014.11)

(58) Field of Classification Search
CPC .. H04N 19/139; H04N 19/176; H04N 19/513; H04N 19/517; H04N 19/54
See application file for complete search history.

(56) References Cited

U.S. PATENT DOCUMENTS

2003/0194010 A1* 10/2003 Mukerjee ............. H04N 19/117
375/E7.26
2013/0272410 A1* 10/2013 Seregin ................. H04N 19/52
375/240.16

(Continued)

FOREIGN PATENT DOCUMENTS

TW          201739252 A     11/2017
WO       2017/156705 A1      9/2017

OTHER PUBLICATIONS

Chinese language office action dated Jan. 8, 2021, issued in application No. TW 108131826.

*Primary Examiner* — Jessica M Prince
(74) *Attorney, Agent, or Firm* — McClure, Qualey & Rodack, LLP

(57) ABSTRACT

A method and apparatus for coding system receives input data related to a current block in a current picture at a video encoder side or a video bitstream corresponding to compressed data including the current block at a video decoder side; determines one or more MVs (motion vectors) associated with a target Inter coding tool for the current block at the video encoder side or at the video decoder side, applies a same conversion process to said one or more MVs to generate one or more converted MVs at the video encoder side or at the video decoder side when the target Inter coding tool belongs to at least two tools of a group; and encodes the current block or motion information of the current block using said one more converted MVs at the video encoder side.

13 Claims, 5 Drawing Sheets

Related U.S. Application Data

(60) Provisional application No. 62/815,761, filed on Mar. 8, 2019, provisional application No. 62/789,564, filed on Jan. 8, 2019, provisional application No. 62/726,911, filed on Sep. 4, 2018.

(56) References Cited

U.S. PATENT DOCUMENTS

| | | | |
|---|---|---|---|
| 2017/0332095 A1 | 11/2017 | Zou et al. | |
| 2018/0098063 A1* | 4/2018 | Chen | H04N 19/52 |
| 2018/0098089 A1 | 4/2018 | Chen et al. | |
| 2019/0045218 A1* | 2/2019 | Ikai | H04N 19/59 |
| 2019/0082191 A1 | 3/2019 | Chuang et al. | |
| 2019/0349588 A1 | 11/2019 | Chen et al. | |
| 2020/0077113 A1* | 3/2020 | Huang | H04N 19/167 |
| 2020/0236388 A1* | 7/2020 | Esenlik | H04N 19/52 |
| 2020/0280735 A1 | 9/2020 | Lim et al. | |
| 2021/0076061 A1* | 3/2021 | Lin | H04N 19/137 |
| 2021/0120262 A1* | 4/2021 | Chen | H04N 19/513 |
| 2021/0250604 A1* | 8/2021 | Su | H04N 19/174 |

* cited by examiner

METHOD AND APPARATUS OF MOTION-VECTOR ROUNDING UNIFICATION FOR VIDEO CODING SYSTEM

CROSS REFERENCE TO RELATED APPLICATIONS

The present invention is a Continuation of pending U.S. Utility patent application Ser. No. 16/559,966, filed on Sep. 4, 2019, which claims priority to U.S. Provisional Patent Application, Ser. No. 62/726,911, filed on Sep. 4, 2018, U.S. Provisional Patent Application Ser. No. 62/789,564, filed on Jan. 8, 2019, and U.S. Provisional Patent Application, Ser. No. 62/815,761, filed on Mar. 8, 2019. The U.S. Provisional Patent Applications are hereby incorporated by reference in their entireties.

FIELD OF THE INVENTION

The present invention relates to video coding using various Inter coding tools. In particular, the present invention relates to motion vector (MV) rounding for various Inter coding tools.

BACKGROUND AND RELATED ART

Various video coding standards have been developed over the past two decades. In newer coding standards, more powerful coding tools are used to improve the coding efficiency. High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In most coding standards, adaptive Inter/Intra prediction is used on a block basis. In the Inter prediction mode, one or two motion vectors are determined for each block to select one reference block (i.e., uni-prediction) or two reference blocks (i.e., bi-prediction). The motion vector or motion vectors are determined and coded for each individual block. In HEVC, Inter motion compensation is supported in two different ways: explicit signalling or implicit signalling. In explicit signalling, the motion vector for a block (i.e., PU) is signalled using a predictive coding method. The motion vector predictors correspond to motion vectors associated with spatial and temporal neighbours of the current block. After a MV predictor is determined, the motion vector difference (MVD) is coded and transmitted. This mode is also referred as AMVP (advanced motion vector prediction) mode. In implicit signalling, one predictor from a candidate predictor set is selected as the motion vector for the current block (i.e., PU). Since both the encoder and decoder will derive the candidate set and select the final motion vector in the same way, there is no need to signal the MV or MVD in the implicit mode. This mode is also referred as Merge mode. The forming of predictor set in Merge mode is also referred as Merge candidate list construction. An index, called Merge index, is signalled to indicate the predictor selected as the MV for current block.

Affine Model

Motion occurs across pictures along temporal axis can be described by a number of different models. Assuming A(x, y) be the original pixel at location (x, y) under consideration, A' (x', y') be the corresponding pixel at location (x', y') in a reference picture for a current pixel A(x, y), the affine motion models are described as follows.

The affine model is capable of describing two-dimensional block rotations as well as two-dimensional deformations to transform a square (or rectangles) into a parallelogram. This model can be described as follows:

$$x' = a_0 + a_1 * x + a_2 * y, \text{ and} \quad (1)$$
$$y' = b_0 + b_1 * x + b_2 * y.$$

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control point motion vectors or four parameters as follows, where (vx, vy) represents the motion vector $$\begin{cases} x' = ax + by + e \\ y' = -bx + ay + f \\ vx = x - x' \\ vy = y - y' \end{cases} \overset{\Delta}{\Rightarrow} \begin{cases} vx = (1-a)x - by - e \\ vy = (1-a)y + bx - f \end{cases} \quad (2)$$

An example of the four-parameter affine model is shown in FIG. 1A, where block 110 corresponds to the current block. The transformed block is a rectangular block. The four-parameter affine model can handle object rotation as shown in FIG. 1B, where the rectangle 110 is rotated to rectangle 120. The location of the rotated rectangle 120 can be specified by the motion vectors (i.e., $\vec{v}_0$ and $\vec{v}_1$) at two control points. The four-parameter affine model can also handle object rotation with size scaling.

The motion vector field of each point in this moving block can be described by the following equation:

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases} \quad (3)$$

In the above equations, $(v_{0x}, v_{0y})$ is the control point motion vector (i.e., $v_0$) at the upper-left corner of the block, and $(v_{1x}, v_{1x})$ is another control point motion vector (i.e., $v_1$) at the upper-right corner of the block.

A six-parameter affine model has disclosed in JVET-K0337 (Han et al., "CE4.1.3: Affine motion compensation prediction", Joint Video Exploration Team (JVET) of ITU-T SG 16 WP 3 and ISO/IEC JTC 1/SC 29/WG 11, 11th Meeting: Ljubljana, SI, 10-18 Jul. 2018, Document: JVET-K0337) for the affine Merge mode and affine Inter mode.

The six-parameter affine model uses 3 control points ($\vec{v}_0$, $\vec{v}_1$ and $\vec{v}_2$) as shown in FIG. 2, where block 210 corresponds to a current PU. The six-parameter affine motion model is capable of transforming a rectangle into a parallelogram 220. When an affine motion block is moving, the motion vector field of the block can be described by three control point motion vectors or four parameters as follows, where (vx, vy) represents the motion vector $$\begin{cases} x' = ax + by + e \\ y' = cx + dy + f \\ vx = x - x' \\ vy = y - y' \end{cases} \quad (4)$$

When the MVs ($v_0$ and $v_1$) of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used. An example of motion vectors for a current block can be determined for each 4×4 sub-block based on the MVs of the two control points as shown in FIG. 3 according to equation (3).

When the MVs ($v_0$, $v_1$ and $v_2$) of three control points are decoded, the MV of each 4×4 block can be derived according to the following equation:

$$\begin{cases} v_x = \frac{(v_{1x} - v_{0x})}{w} x + \frac{(v_{2x} - v_{0x})}{h} y + v_{0x} \\ v_y = \frac{(v_{1y} - v_{0y})}{w} x + \frac{(v_{2y} - v_{0y})}{h} y + v_{0y} \end{cases} \quad (5)$$

An example of motion vectors for a current block can be determined for each 4×4 sub-block based on the MVs of the three control points as shown in FIG. 3 according to equation (5). The MV of the centre pixel (i.e., position at (2, 2) of a 4×4 block) represents the MV of the 4×4 block. The MV precision is clipped to 1/16-pel precision.

In ITU-T13-SG16-C-1016, for an Inter mode coded CU, when the CU size is equal to or larger than 16×16, an affine_flag is signalled to indicate whether the affine Inter mode is applied or not. If the current CU is in Affine Inter mode, a candidate MVP set list is built using the neighbour valid reconstructed blocks. For corner derived candidate (constructed candidate), the control point MVs are derived from different neighbouring blocks as shown in FIG. 4, where block 410 corresponds to a current block. The process searches the first available MV in {a0, a1, a} (named group A), the first available MV in {b0, b1} (named group B), and the first available MV in {c0, c1} (named group C). For 4 parameter affine mode, the motion vectors {$MV_A$, $MV_B$} are used. For 6-parameter affine mode, the motion vectors {$MV_A$, $MV_B$, $MV_C$} are used. The index of candidate MVP set is signalled in the bit stream. The MV difference (MVD) of the two control points are coded in the bitstream.

In ITU-T13-SG16-C-1016, an affine Merge mode is also proposed. If the current PU is a Merge PU, the neighbouring five blocks (c0, b0, b1, c1, and a0 blocks in FIG. 4) are checked whether one of them is affine inter mode or affine merge mode. If yes, an affine_flag is signalled to indicate whether the current PU is affine mode. When the current PU is applied in Affine Merge mode, it gets the first block coded with affine mode from the valid neighbour reconstructed blocks. The selection order for the candidate block is from left, above, above right, left bottom to above left (c0→b0→b1→c1→a0) as shown in FIG. 4. The affine parameter of the first affine coded block is used to derive the $v_0$ and $v_1$ for the current PU.

In HEVC, the decoded MVs of each PU are downsampled with a 16:1 ratio and stored in the temporal MV buffer for the MVP derivation for the following frames. For a 16×16 block, only the top-left 4×4 MV is stored in the temporal MV buffer and the stored MV represents the MV of the whole 16×16 block.

Advanced Motion Vector Resolution (AMVR)

To improve the coding gain, the Advanced Motion Vector Resolution (AMVR) has also been introduced recently. The AMVR can adaptively switch the resolution of Motion Vector Difference (MVD). The Motion Vector Difference (MVD) between a current MV and the MV predictor of a PU can be coded with either quarter-pel resolution or integer-pel resolution. The switching is controlled at coding unit (CU) level and an integer MVD resolution flag is (conditionally) signalled.

More details regarding AMVR can be found in JVET-C1001 ((Xu Chen, et al., "Algorithm Description of Joint Exploration Test Model 3", Joint Video Exploration Team (JVET) of ITU-T SG 16 WP 3 and ISO/IEC JTC 1/SC 29/WG 11, 3rd Meeting: Geneva, CH, 26 May-1 Jun. 2016, Document: JVET-C1001).

In JVET-E0076 (Chen et al., "EE5EE4: Enhanced Motion Vector Difference Coding", Joint Video Exploration Team (JVET) of ITU-T SG 16 WP 3 and ISO/IEC JTC 1/SC 29/WG 11, the 5th JVET meeting, January 2017, Geneva, Document: JVET-E0076), a modified MVD coding method has been adopted. The modified MVD coding method includes two elements: a) 4-pel accuracy for MVD signalling (in addition to ¼-pel and integer-pel MVD accuracy, and b) switchable binarization and context model selection. According to JVET-E0076, a first flag is signalled to indicate whether ¼-pel MV precision for the luma signal is used in a CU. When the first flag indicates that ¼-pel MV precision for the luma signal is not used, another flag is signalled to indicate whether integer luma sample or four luma samples MV precision is used.

In the above, some Inter coding tools such as the affine Merge candidate derivation, affine sub-block MV derivation and AMVR involve MV precision rounding. Furthermore, different MV rounding methods are used by different Inter coding tools.

BRIEF SUMMARY OF THE INVENTION

Method and apparatus of video coding performed by a video encoder or a video decoder that utilizes an Inter coding tool are disclosed. According to one method, input data related to a current block in a current picture are received at a video encoder side or a video bitstream corresponding to compressed data including the current block is received at a video decoder side. One or more MVs (motion vectors) associated with a target Inter coding tool for the current block are received at the video encoder side or one or more coded MVs of said one or more MVs are received at the video decoder side. A same conversion process is applied to said one or more MVs to generate one or more converted MVs at the video encoder side or at the video decoder side when the target Inter coding tool belongs to at least two tools of a group, wherein the group comprises at least one of inherited affine Merge candidate derivation and affine sub-block MV derivation. The current block or motion information of the current block is encoded using said one more converted MVs at the video encoder side or the current block or the motion information of the current block is decoded using said one or more converted MVs at the video decoder side.

In some embodiments, the group may further comprises pair-wise Merge candidate derivation or Adaptive MV Resolution (AMVR).

The same conversion process may comprise MV rounding, MV scaling, right-shifting, or a combination thereof. In one embodiment, the same conversion process comprises rounding-to-zero process. In one embodiment, the rounding-to-zero process is implemented as MV_rounded=(MV+offset−(MV>=0))>>shift, and wherein MV represents a target MV being applied the same conversion process, MV_rounded represents a converted target MV, shift represents an integer corresponding to a number of bits for a right-shift operation, offset is equal to (1<<(shift−1)), and "<<" represent a left-shift operation.

In one embodiment, the same conversion process comprises rounding-away-from-zero process.

When the target Inter coding tool corresponds to the inherited affine Merge candidate derivation, said one or more MVs corresponds to one or more affine control point MVs. The method may further comprise clipping said one or more affine control point MVs in a certain range to be stored in an MV buffer without data overflow. The clipped MV range is in −2^(k−1) to 2^(k−1)−1. The k is 16 or 18.

When the target Inter coding tool corresponds to the affine sub-block MV derivation, said one or more MVs corresponds to one or more derived affine sub-block MVs. The method may further comprise clipping said derived affine sub-block MVs in a certain range to be stored in an MV buffer without data overflow. The clipped MV range is in −2^(k−1) to 2^(k−1)−1. The k is 16 or 18.

According to another method, a rounding-to-zero process is applied to said one or more MVs to generate one or more converted MVs at the video encoder side or at the video decoder side, wherein the rounding-to-zero process is implemented as MV_rounded=(MV+offset−(MV>=0)) >>shift, and wherein MV represents a target MV being applied the rounding-to-zero process, MV_rounded represents a converted target MV, shift represents an integer corresponding to a number of bits for a right-shift operation, offset is equal to (1<<(shift−1)), and "<<" represent a left-shift operation.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
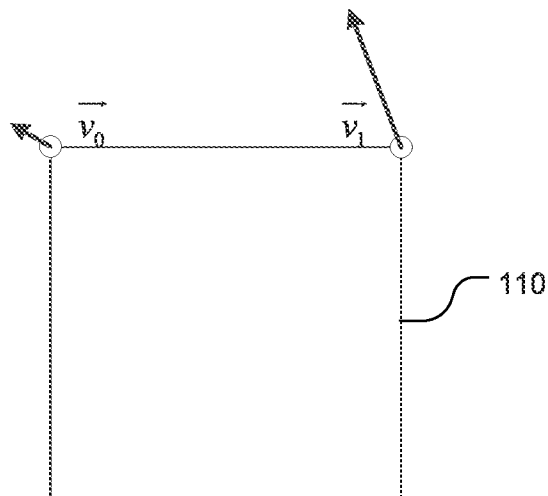
FIG. 1A illustrates an example of the four-parameter affine model, where the motion of a block is modelled by two motion vectors at two corners of the block.
Figure 1B:
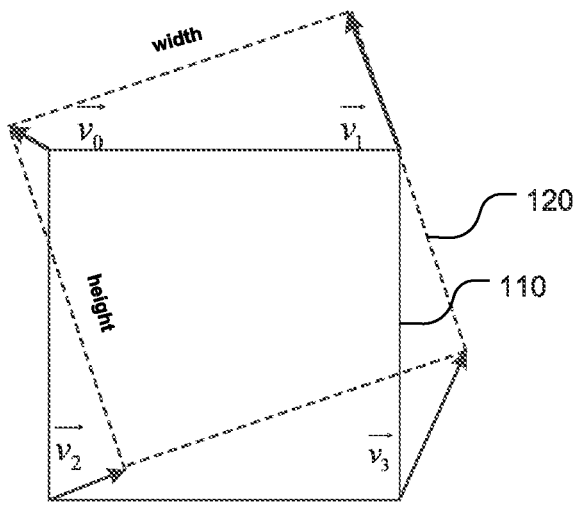
FIG. 1B illustrates an example of the transformed block according to a four-parameter affine model, where the affine model can handle block rotation.
Figure 2:
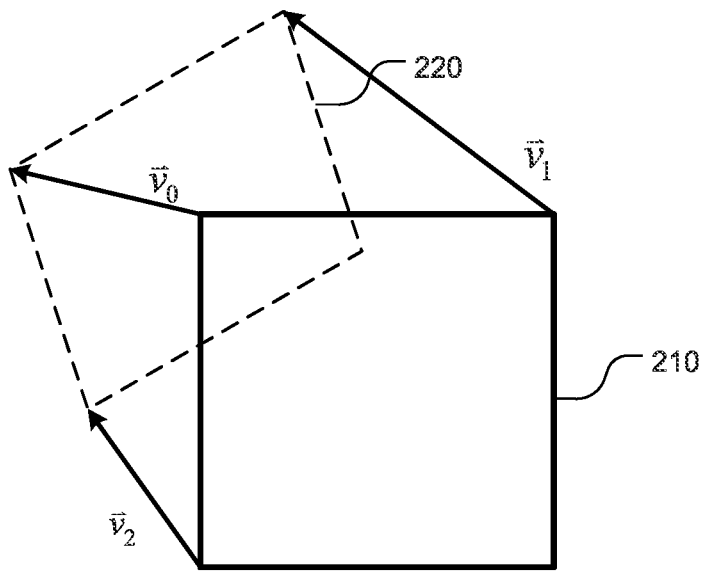
FIG. 2 illustrates an example of the six-parameter affine model, where the motion of a block is modelled by three motion vectors at three corners of the block.
Figure 3:
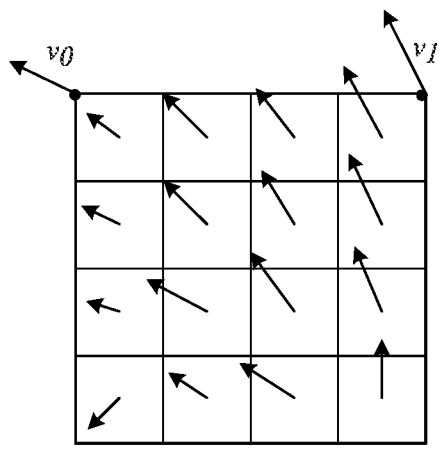
FIG. 3 illustrates an example of motion vectors for 4×4 sub-blocks of a current block, where the motion vectors are derived based on the MVs of the two control points.
Figure 4:
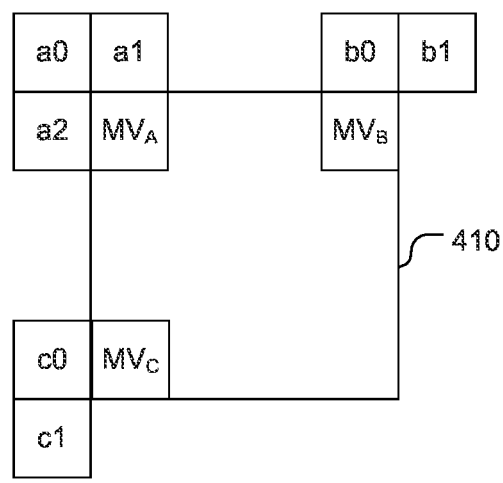
FIG. 4 illustrates an example of corner derived candidate (constructed candidate), where the control point MVs are derived from different neighbouring blocks.

In one embodiment, if affine inherited candidate derivation for the 6-parameter affine model is used, the MVP set of the three control points (i.e., $\vec{v}_0$, $\vec{v}_1$ and $\vec{v}_2$ in FIG. 2) can be derived by following equation:

$$V_{0\_x} = V_{B0\_x} + (V_{B2\_x} - V_{B0\_x}) * (\text{posCurPU\_Y} - \text{posRefPU\_Y})/\text{RefPU\_height} + (V_{B1\_x} - V_{B0\_x}) * (\text{posCurPU\_X} - \text{posRefPU\_X})/\text{RefPU\_width},$$

$$V_{0\_y} = V_{B0\_y} + (V_{B2\_y} - V_{B0\_y}) * (\text{posCurPU\_Y} - \text{posRefPU\_Y})/\text{RefPU\_height} + (V_{B1\_y} - V_{B0\_y}) * (\text{posCurPU\_X} - \text{posRefPU\_X})/\text{RefPU\_width}.$$

In the above equations, $V_{B0}$, $V_{B1}$, and $V_{B20}$ can be replaced by the top-left MV, top-right MV, and bottom-left MV of any reference/neighbouring PU, (posCurPU_X, posCurPU_Y) are the pixel position of the top-left sample of the current PU relative to the top-left sample of the picture, (posRefPU_X, posRefPU_Y) are the pixel position of the top-left sample of the reference/neighbouring PU relative to the top-left sample of the picture. The remaining two control points can be derived according to:

$$V_{1\_x} = V_{B0\_x} + (V_{B1\_x} - V_{B0\_x}) * \text{PU\_width}/\text{RefPU\_width},$$

$$V_{1\_y} = V_{B0\_y} + (V_{B1\_y} - V_{B0\_y}) * \text{PU\_width}/\text{RefPU\_width},$$

$$V_{2\_x} = V_{B0\_x} + (V_{B2\_x} - V_{B0\_x}) * \text{PU\_height}/\text{RefPU\_height},$$

$$V_{2\_y} = V_{B0\_y} + (V_{B2\_y} - V_{B0\_y}) * \text{PU\_height}/\text{RefPU\_height}.$$

To eliminate the divider operation, all the MV can be multiplied by a predefined or derived number (e.g. the multiple of width and/or height, the common the multiple of width and/or height, CTU width/height, or CTU width/height divided by width/height), or left shifted by a predefined or derived number (e.g. log2 of the multiple of width and/or height, the common the multiple of width and/or height, CTU width/height, or CTU width/height divided by width/height). Then the divider can be replaced by a simple right shift. In another example, the MVx and MVy can be multiplied or left shifted by a different value. In another example, the term of "$(V_{B1\_K}-V_{B0\_K})$" and "$(V_{B2\_K}-V_{B0\_K})$" can be multiplied or left shifted by different values, where K can be x or y. For example, "$(V_{B1\_K}-V_{B1\_K})$" can be multiplied by CTU_width/RefPU_width or left shifted by log 2(CTU_width/RefPU_width), "$(V_{B2\_K}-V_{B0\_K})$" can be multiplied by CTU_width/RefPU_height or left shifted by log2(CTU_width/RefPU_height).

For example, the above equations for affine inherited candidate derivation can be modified for divider-less operations:

$$V_{0\_x} = V_{B0\_x} * \text{CTU\_width} + (V_{B2\_x} - V_{B0\_x}) * \text{CTU\_width}/$$
$$\text{RefPU\_height}*(\text{posCurPU\_Y} - \text{posRefPU\_Y}) + (V_{B1\_x} - V_{B0\_x})*$$
$$\text{CTU\_width}/\text{RefPU\_width}*(\text{posPurPU\_X} - \text{posRefPU\_X}),$$

$$V_{0\_y} = V_{B0\_y} * \text{CTU\_width} + (V_{B2\_y} - V_{B0\_y}) * \text{CTU\_width}/$$
$$\text{RefPU\_height}*(\text{posCurPU\_Y} - \text{posRefPU\_Y}) + (V_{B1\_y} - V_{B0\_y})*$$
$$\text{CTU\_width}/\text{RefPU\_width}*(\text{posCurPU\_X} - \text{posRefPU\_X}),$$

$$V_{1\_x} = V_{0\_x} + (V_{B1\_x} - V_{B0\_x}) * \text{CTU\_width}/\text{RefPU\_width} * \text{PU\_width},$$

$$V_{1\_y} = V_{0\_y} + (V_{B1\_y} - V_{B0\_y}) * \text{CTU\_width}/\text{RefPU\_width} * \text{PU\_width},$$

$$V_{2\_x} = V_{0\_x} + (V_{B2\_x} - V_{B0\_x}) * \text{CTU\_width}/\text{RefPU\_height} * \text{PU\_height},$$

$$V_{2\_y} = V_{0\_y} + (V_{B2\_y} - V_{B0\_y}) * \text{CTU\_width}/\text{RefPU\_height} * \text{PU\_height}.$$

In another example, the shift operation can be used to avoid the need for division:

$$V_{0\_x} = V_{B0\_x} << \log2\_\text{CTU\_width} +$$
$$(V_{B2\_x} - V_{B0\_x})*(\text{posCurPU\_Y} - \text{posRefPU\_Y}) <<$$
$$(\log2\_\text{CTU\_width} - \log2\_\text{RefPU\_height}) +$$
$$(V_{B1\_x} - V_{B0\_x})*(\text{posCurPU\_X} - \text{posRefPU\_X}) <<$$
$$(\log2\_\text{CTU\_width} - \log2\_\text{RefPU\_width}),$$

$$V_{0\_y} = V_{B0\_y} << \log2\_\text{CTU\_width} + (V_{B2\_y} - V_{B0\_y})*$$
$$(\text{posCurPU\_Y} - \text{posRefPU\_Y}) <<$$
$$(\log2\_\text{CTU\_width} - \log2\_\text{RefPU\_height}) +$$
$$(V_{B1\_y} - V_{B0\_y})*(\text{posCurPU\_X} - \text{posRefPU\_X}) <<$$
$$(\log2\_\text{CTU\_width} - \log2\_\text{RefPU\_width}),$$

$$V_{1\_x} = V_{0\_x} + (V_{B1\_x} - V_{B0\_x}) * \text{PU\_width} <<$$
$$(\log2\_\text{CTU\_width} - \log2\_\text{RefPU\_width}),$$

$$V_{1\_y} = V_{0\_y} + (V_{B1\_y} - V_{B0\_y}) * \text{PU\_width} <<$$
$$(\log2\_\text{CTU\_width} - \log2\_\text{RefPU\_width}),$$

$$V_{2\_x} = V_{0\_x} + (V_{B2\_x} - V_{B0\_x}) * \text{PU\_height} <<$$
$$(\log2\_\text{CTU\_width} - \log2\_\text{RefPU\_height}),$$

$$V_{2\_y} = V_{0\_y} + (V_{B2\_y} - V_{B0\_y}) * \text{PU\_height} <<$$
$$(\log2\_\text{CTU\_width} - \log2\_\text{RefPU\_height}).$$

In yet another example, the shift operation can be used to avoid the need for division:

$$V_{B0\_x} = V_{B0\_x} << \log2\_\text{CTU\_width},$$
$$V_{B0\_y} = V_{B0\_y} << \log2\_\text{CTU\_width},$$
$$V_{B1\_x} = V_{B1\_x} << \log2\_\text{CTU\_width},$$
$$V_{B1\_y} = V_{B1\_y} << \log2\_\text{CTU\_width},$$
$$V_{B2\_x} = V_{B2\_x} << \log2\_\text{CTU\_width},$$
$$V_{B2\_y} = V_{B2\_y} << \log2\_\text{CTU\_width}.$$

$$V_{0\_x} = V_{B0\_x} +$$
$$(V_{B2\_x} - V_{B0\_x})*(\text{posCurPU\_Y} - \text{posRefPU\_Y}) >>$$
$$\log2\_\text{RefPU\_height} +$$
$$(V_{B1\_x} - V_{B0\_x})*(\text{posCurPU\_X} - \text{posRefPU\_X}) >> \log2\_\text{CTU\_width},$$

$$V_{0\_y} = V_{B0\_y} + (V_{B2\_y} - V_{B0\_y})*(\text{posCurPU\_Y} - \text{posRefPU\_Y}) >>$$
$$\log2\_\text{RefPU\_height} +$$
$$(V_{B1\_y} - V_{B0\_y})*(\text{posCurPU\_X} - \text{posRefPU\_X}) >> \log2\_\text{RefPU\_width},$$

$$V_{1\_x} = V_{0\_x} + (V_{B1\_x} - V_{B0\_x}) * \text{PU\_width} >> \log2\_\text{RefPU\_width},$$

$$V_{1\_y} = V_{0\_y} + (V_{B1\_y} - V_{B0\_y}) * \text{PU\_width} >> \log2\_\text{RefPU\_width},$$

$$V_{2\_x} = V_{0\_x} + (V_{B2\_x} - V_{B0\_x}) * \text{PU\_height} >> \log2\_\text{RefPU\_height},$$

$$V_{2\_y} = V_{0\_y} + (V_{B2\_y} - V_{B0\_y}) * \text{PU\_height} >> \log2\_\text{RefPU\_height}.$$

The $V_{0\_x}, V_{0\_y}, V_{1\_x}, V_{1\_y}, V_{2\_x}, V_{2\_y}$, are then divided by CTU_width or right-shift by log2(CTU_width).

In one embodiment, for the right-shift operation, if the MV is negative value, it needs to be converted to positive value and right-shift, and then converted back to negative value. For example, MV=MV>=0? (MV>>M):-((-MV)>>M). M can be log2_CTU_width.

In another embodiment, a rounding offset can be added. The offset can be equal to 0.5 (i.e., round toward infinite or rounding away from zero) or smaller than 0.5 (i.e., round toward zero). For example, MV=MV>=0? ((MV+offset)>>M):-(((-MV)+offset)>>M). Offset can be (1<<(M-1))-1 (i.e., round toward zero) or 1<<(M-1) (i.e., round toward infinite). In one example, M can be log2_CTU_width.

In affine MVP derivation, the control point MVP might be derived from the affine model equation with division, right-shift, or rounding. In another example, in Merge mode or Inter mode MVP derivation, when the adaptive MV resolution (AMVR) is applied, the MVP or neighbouring MV might need to be scaled or need to be rounded to a certain resolution (e.g. ¼-pel, half-pel, integer-pel, two-pel, four-pel, eight-pel, or 16-pel). For example, if the MV resolution of the current block is integer-pel or four-pel, and the MVP or neighbouring MV is stored in 1/16-pel or quarter-pel precision, the MVP or neighbouring MV needs to be right-shifted to current block MV precision (i.e., the target MV precision) or rounded to current block MV precision (e.g. by a right-shift and followed by a left-shift). For these scaling/rounding/right-shift, the unified processed are proposed. The same processes are applied for these scaling/rounding/right-shift. The scaling/rounding/right-shift processes is also referred as MV conversion process in this disclosure. It is proposed to unify the MV rounding process. It is proposed to align the MV rounding process into one general function. The MV rounding may include the MV rounding in temporal/spatial/Merge-with-MVD MV scaling process, the MV rounding in the affine control point derivation, the MV rounding in the affine sub-block MV derivation, the MV rounding in the adaptive MV resolution, the MV rounding for pair-wise merging candidate derivation, the MV rounding for MV averaging or MV weighted averaging, the MV precision change in AMVR, the MV rounding when converting higher precision MV to lower precision MV, MV derivation in affine motion compensated sample refinement with optical flow, and/or the MV rounding in fixed-point MV to floating-point MV or floating-point MV to fixed-point MV conversion in temporal reference MV buffer compression. The same equation should be used only with different "shift".

In one embodiment, the following equations are used. It rounds the MV to infinite:

$$\text{mvx\_rounded} = (mvx + \text{offset} - (mvx < 0)) >> \text{shift},$$
$$\text{mvy\_rounded} = (mvy + \text{offset} - (mvy < 0)) >> \text{shift};$$
$$\text{mvx\_rounded} = (mvx + \text{offset} - (mvx <= 0)) >> \text{shift},$$
$$\text{mvy\_rounded} = (mvy + \text{offset} - (mvy <= 0)) >> \text{shift};$$
$$\text{mvx\_rounded} = (mvx + \text{offset} + (mvx > 0)) >> \text{shift},$$
$$\text{mvy\_rounded} = (mvy + \text{offset} + (mvy > 0)) >> \text{shift}; \text{ or}$$
$$\text{mvx\_rounded} = (mvx + \text{offset} + (mvx >= 0)) >> \text{shift},$$
$$\text{mvy\_rounded} = (mvy + \text{offset} + (mvy >= 0)) >> \text{shift};$$

where the offset is equal to (1<<(shift−1))−1.

In one embodiment, the following equations are used. It rounds the MV toward the zero:

$$\text{mvx\_rounded} = (mvx + \text{offset} + (mvx > 0)) >> \text{shift},$$
$$\text{mvy\_rounded} = (mvy + \text{offset} + (mvy > 0)) >> \text{shift}; \text{ or}$$
$$\text{mvx\_rounded} = (mvx + \text{offset} + (mvx >= 0)) >> \text{shift},$$
$$\text{mvy\_rounded} = (mvy + \text{offset} + (mvy >= 0)) >> \text{shift};$$

where the offset is equal to (1<<(shift−1))−1.

In one embodiment, the following equations are used.

$$\text{mvx\_rounded} = (mvx + \text{offset} + (mvx < 0)) >> \text{shift},$$
$$\text{mvy\_rounded} = (mvy + \text{offset} + (mvy < 0)) >> \text{shift}; \text{ or}$$
$$\text{mvx\_rounded} = (mvx + \text{offset} + (mvx <= 0)) >> \text{shift},$$
$$\text{mvy\_rounded} = (mvy + \text{offset} + (mvy <= 0)) >> \text{shift};$$

where the offset is equal to (1<<(shift−1))−1.

Note that the "(X<0)" can be implemented as X>>(bit-depth−1) or take its MSB. The (mvx>0) or (mvx>=0) can be implemented as XOR(X>>(bit-depth−1)) or use exclusive-or 1'bit1 with X's MSB or invert the X's MSB.

In another embodiment, for all the affine control point MVs and/or all the derived affine sub-block MVs, the MV should be clipped in a certain range to be stored in a MV buffer without data overflow. For example, all the affine control point MVs and/or all the derived affine sub-block MVs should be clipped in a range of [−2^(K−1), 2^(K−1)−1] or [−2^(K−1)+1, 2^(K−1)−1], where K can be 8, 16, 18, 24, or 32. In this way, the affine derived MVs and control point MVs can be stored in a K-bits buffer. In the above equation, 2^x means 2 to the power of x.

For example, if K is 16, the mvx and mvy are clipped as follow:

$$\text{Clip\_mvx} = Clip3(-32768, 32767, mvx),$$
$$\text{Clip\_mvy} = Clip3(-32768, 32767, mvy). \text{ or}$$
$$\text{Clip\_mvx} = Clip3(-32767, 32767, mvx),$$
$$\text{Clip\_mvy} = Clip3(-32767, 32767, mvy).$$

If K is 18, the mvx and mvy are clipped as follow:

$$\text{Clip\_mvx} = Clip3(-131072, 131071, mvx),$$
$$\text{Clip\_mvy} = Clip3(-131072, 131071, mvy). \text{ or}$$
$$\text{Clip\_mvx} = Clip3(-131071, 131071, mvx),$$
$$\text{Clip\_mvy} = Clip3(-131071, 131071, mvy).$$

Note that the above proposed methods can be applied on affine Merge candidate list construction, affine AMVP MVP candidate list construction, or the unified Merge candidate list construction.

Figure 5:
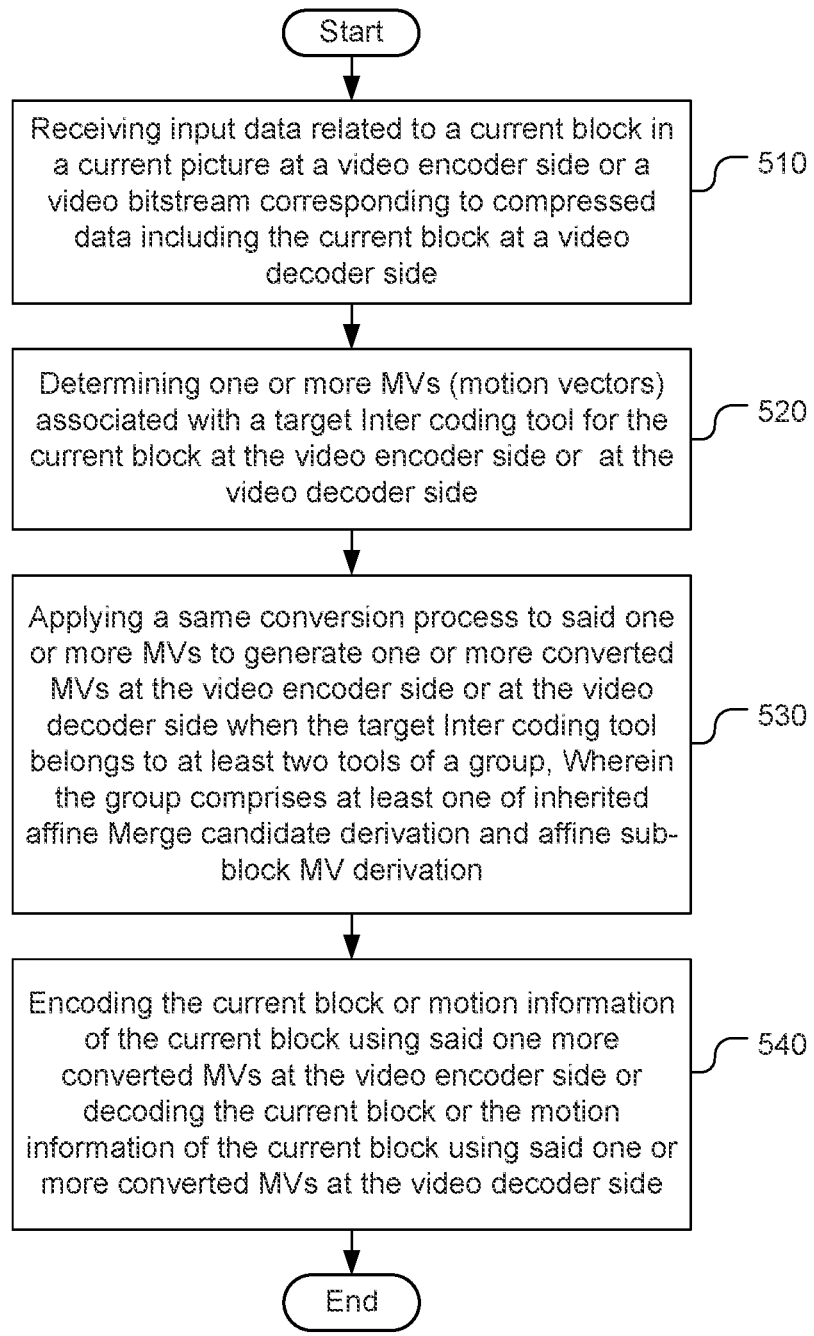
FIG. 5 illustrates an exemplary flowchart for a video coding system incorporating an embodiment of the present invention, where all Inter coding tools use the same motion vector conversion process.

FIG. 5 illustrates an exemplary flowchart for a video coding system incorporating an embodiment of the present invention, where all Inter coding tools use the same motion vector conversion process. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data related to a current block are received at a video encoder side or a video bitstream corresponding to compressed data including the current block is received at a video decoder side in step 510. One or more MVs (motion vectors) associated with a target Inter coding tool for the current block are determined at the video encoder side or at the video decoder side in step 520. In step 530, a same conversion process is applied to said one or more MVs to generate one or more converted MVs at the video encoder side or at the video decoder side when the target Inter coding tool belongs to at least two tools of a group, wherein the group comprises at least one of inherited affine Merge candidate derivation and affine sub-block MV derivation. The current block or motion information of the current block is encoded using said one more converted MVs at the video encoder side or the current block or the motion information of the current block is decoded using said one or more converted MVs at the video decoder side in step 540.

Pair-Wise Merge Candidate

In JVET-L0090 (Hsiao, et al., "CE4.4.12: *Pairwise average candidates*", in Joint Video Exploration Team (JVET) of ITU-T SG 16 WP 3 and ISO/IEC JTC 1/SC 29/WG 11, 12th Meeting: Macao, CN, 3-12 Oct. 2018, Document: JVET-L0090), pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote the Merge indices to the Merge candidate list. The averaged motion vectors are calculated separately for each reference list. If both motion vectors are available in one list, these two motion vectors are averaged even when they point to different reference pictures; if only one motion vector is available, use the one directly; and if no motion vector is available, keep this list invalid. The pairwise average candidates replaces the combined candidates in HEVC standard.

Figure 6:
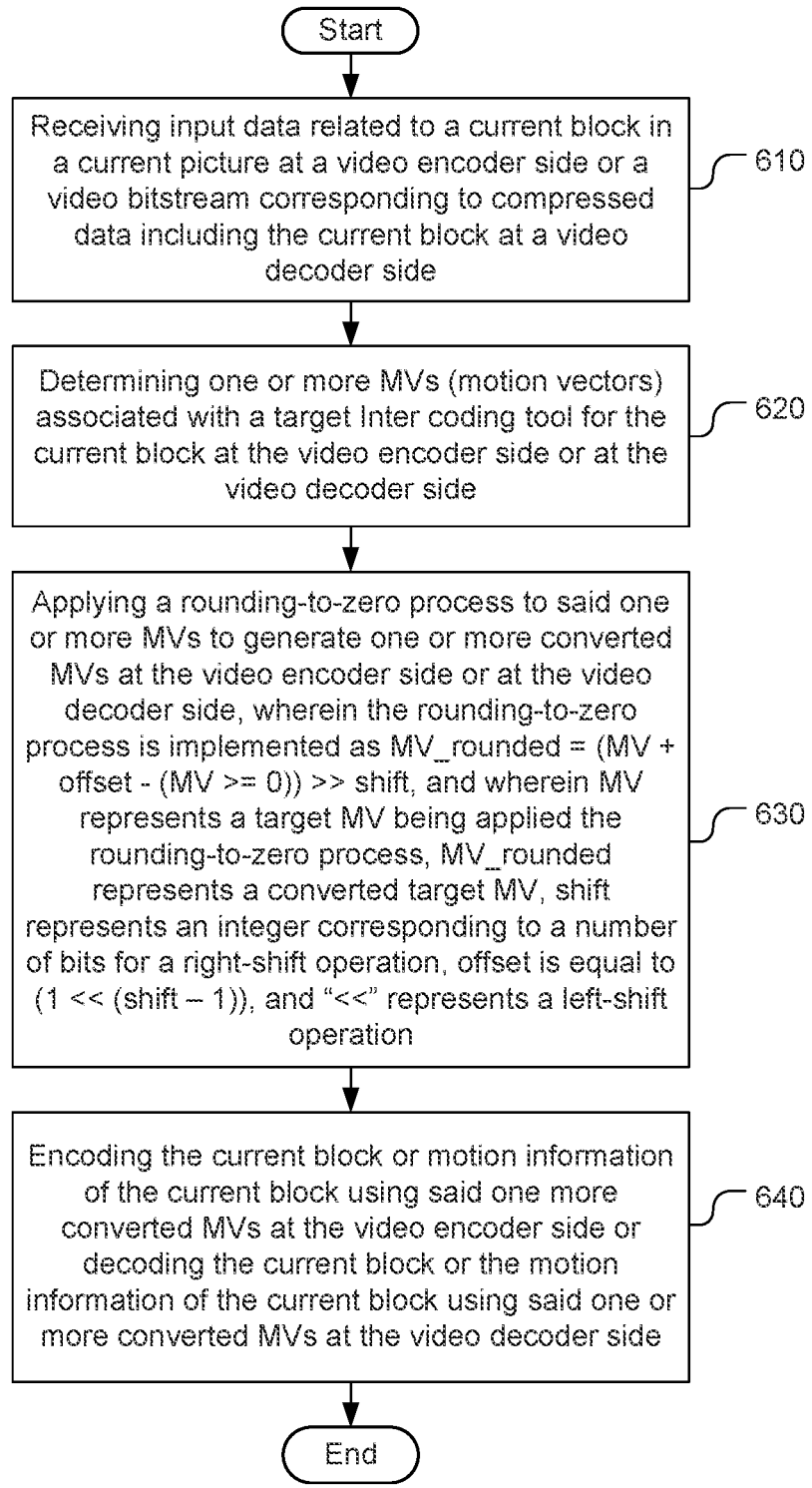
FIG. 6 illustrates another exemplary flowchart for a video coding system incorporating an embodiment of the present invention, where the motion vector conversion process is simplified according to an embodiment of the present invention.

FIG. 6 illustrates another exemplary flowchart for a video coding system incorporating an embodiment of the present invention, where the motion vector conversion process is simplified according to an embodiment of the present invention. According to this method, input data related to a current block are received at a video encoder side or a video bitstream corresponding to compressed data including the current block is received at a video decoder side in step 610. One or more MVs (motion vectors) associated with a target Inter coding tool for the current block are determined at the video encoder side or at the video decoder side in step 620. In step 630, a rounding-to-zero process is applied to said one or more MVs to generate one or more converted MVs at the video encoder side or at the video decoder side, wherein the rounding-to-zero process is implemented as MV_rounded= (MV+offset−(MV>=0))>>shift, and wherein MV represents a target MV being applied the rounding-to-zero process, MV_rounded represents a converted target MV, shift represents an integer corresponding to a number of bits for a right-shift operation, offset is equal to (1<<(shift−1)), and "<<" represent a left-shift operation. The current block or motion information of the current block is encoded using said one more converted MVs at the video encoder side or the current block or the motion information of the current block is decoded using said one or more converted MVs at the video decoder side in step 640.

Any of the foregoing proposed methods can be implemented in encoders and/or decoders. For example, any of the proposed methods can be implemented in MV derivation module of an encoder, and/or a MV derivation module of a decoder. Alternatively, any of the proposed methods can be implemented as a circuit coupled to the MV derivation module of the encoder and/or the MV derivation module of the decoder, so as to provide the information needed by the MV derivation module.

The flowcharts shown are intended to illustrate an example of video according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding performed by a video encoder or a video decoder that utilizes an Inter coding tool, the method comprising:
  receiving input data related to a current block in a current picture at a video encoder side or a video bitstream corresponding to compressed data including the current block at a video decoder side;
  determining one or more MVs (motion vectors) associated with a target Inter coding tool for the current block at the video encoder side or at the video decoder side;
  applying a same conversion process to said one or more MVs to generate one or more converted MVs at the video encoder side or at the video decoder side when the target Inter coding tool belongs to at least two tools of a group, wherein the group comprises at least one of inherited affine Merge candidate derivation and affine sub-block MV derivation, wherein the same conversion process comprises a specific rounding process, wherein the specific rounding process comprises rounding a value to a nearest integer value when there is only one nearest integer value, and rounding the value to an integer value when the value is midway between two integer values, regardless of whether the value is a positive or negative value, wherein the integer value comprises the one of the two integer values that is closer to zero; and
  encoding the current block or motion information of the current block using said one more converted MVs at the video encoder side or decoding the current block or the motion information of the current block using said one or more converted MVs at the video decoder side.

2. The method of claim 1, wherein the specific rounding process is implemented as MV_rounded=(MV+offset−(MV>=0))>> shift, wherein MV represents a target MV being applied the same conversion process, MV_rounded represents a converted target MV, shift represents an integer corresponding to a number of bits for a right-shift operation, offset is equal to (1<<(shift−1)), and "<<" represent a left-shift operation.

3. The method of claim 1, wherein when the target Inter coding tool corresponds to inherited affine Merge candidate derivation, said one or more MVs corresponds to one or more affine control point MVs.

4. The method of claim 1, wherein when the target Inter coding tool corresponds to affine sub-block MV derivation, said one or more MVs corresponds to one or more derived affine sub-block MVs.

5. The method of claim 1, wherein rounding the value to the nearest integer value is performed only when there is only one nearest integer value.

6. The method of claim 1, wherein the specific rounding process is implemented by adding an offset to a value corresponding to said one or more MVs before applying a right shift operation.

7. The method of claim 6, wherein the offset is equal to (1<<(shift−1))−1, where "<<" represent a left-shift operation, and the shift represents an integer corresponding to a number of bits for the right shift operation.

8. An apparatus for video coding performed by a video encoder or a video decoder that utilizes an Inter coding tool, the apparatus comprising one or more electronic circuits or processors arranged to:
receive input data related to a current block in a current picture at a video encoder side or a video bitstream corresponding to compressed data including the current block at a video decoder side;
determine one or more MVs (motion vectors) associated with a target Inter coding tool for the current block at the video encoder side or at the video decoder side;
apply a same conversion process to said one or more MVs to generate one or more converted MVs at the video encoder side or at the video decoder side when the target Inter coding tool belongs to at least two tools of a group, wherein the group comprises at least one of inherited affine Merge candidate derivation and affine sub-block MV derivation, wherein the same conversion process comprises a specific rounding process, wherein the specific rounding process comprises rounding a value to a nearest integer value when there is only one nearest integer value, and rounding the value to an integer value when the value is midway between two integer values, regardless of whether the value is a positive or negative value, wherein the integer value comprises the one of the two integer values that is closer to zero; and
encode the current block or motion information of the current block using said one more converted MVs at the video encoder side or decode the current block or the motion information of the current block using said one or more converted MVs at the video decoder side.

9. The apparatus of claim 8, wherein the specific rounding process is implemented as MV_rounded=(MV+offset−(MV>=0))>> shift, wherein MV represents a target MV being applied the same conversion process, MV_rounded represents a converted target MV, shift represents an integer corresponding to a number of bits for a right-shift operation, offset is equal to (1<<(shift−1)), and "<<" represent a left-shift operation.

10. The apparatus of claim 8, wherein when the target Inter coding tool corresponds to inherited affine Merge candidate derivation, said one or more MVs corresponds to one or more affine control point MVs.

11. The apparatus of claim 8, wherein when the target Inter coding tool corresponds to affine sub-block MV derivation, said one or more MVs corresponds to one or more derived affine sub-block MVs.

12. The apparatus of claim 8, wherein the specific rounding process is implemented by adding an offset to a value corresponding to said one or more MVs before applying a right shift operation.

13. The apparatus of claim 12, wherein the offset is equal to (1<<(shift−1))−1, where "<<" represent a left-shift operation, and the shift represents an integer corresponding to a number of bits for the right shift operation.

* * * * *